Feb. 9, 1965 J. W. FLORER ETAL 3,168,824
AUDIBLE LEAK LOCATOR
Filed Aug. 15, 1962 3 Sheets-Sheet 1

INVENTORS
James W. Florer
George W. Gillemot
Claude M. Davis
BY
C. A. Gulbrandsen
Atty.

Feb. 9, 1965 J. W. FLORER ETAL 3,168,824
AUDIBLE LEAK LOCATOR
Filed Aug. 15, 1962 3 Sheets-Sheet 2

INVENTORS
James W. Florer
George W. Gillemot
Claude M. Davis
BY
Atty.

Feb. 9, 1965       J. W. FLORER ETAL       3,168,824
               AUDIBLE LEAK LOCATOR
Filed Aug. 15, 1962                   3 Sheets-Sheet 3

INVENTORS
James W. Florer
George W. Gillemot
Claude M. Davis
BY
C. R. Gulbrandsen
Atty.

United States Patent Office 3,168,824
Patented Feb. 9, 1965

3,168,824
AUDIBLE LEAK LOCATOR
James W. Florer, Santa Monica, George W. Gillemot, Venice, and Claude M. Davis, Santa Monica, Calif., assignors to Automatic Electric Laboratories, Inc., Northlake, Ill., a corporation of Delaware
Filed Aug. 15, 1962, Ser. No. 217,071
1 Claim. (Cl. 73—40.5)

Our invention relates in general to an audible leak detector and more specifically to an arrangement for locating leaks or breaks in the sheath of a telephone cable which has been laid underground in conduit. In present day practice, telephone cables are laid underground in conduit as indicated in FIGURE 1 of the drawing with manholes at intervals and pressure is often applied to the cables at the joints thereof to keep moisture from the wires in the cable. In such systems it becomes important to be able to accurately locate any leaks which may occur in the cable sheath without having to dig up the entire length of the cable.

The object of our invention therefor is to provide a probe which may be inserted into the conduit containing the faulty cable and which contains a microphone and connections therefor which will give audible notice of the location of a leak.

The detector which we have provided consists primarily of an end probe containing a pair of microphones, a series of connecting sections of equal length which may be connected to the probe one at a time to extend it further into the conduit, and an end or handle section with wires connecting it through a highly sensitive portable amplifier unit to a loud speaker. The speaker will give audible notice of the location of the leak when sufficient connecting sections have been inserted between the handle and the probe to extend the probe and its microphones to a position adjacent to the leak in the cable. A pressure of air or nitrogen is applied to the cable under test, as indicated, which gives sufficient pressure so that the air escaping through the leak in the cable will make a sufficiently loud noise so that it will register on the microphones and speaker.

We will now describe the details of our invention by referring to the accompanying drawings in which.

Figure 1:
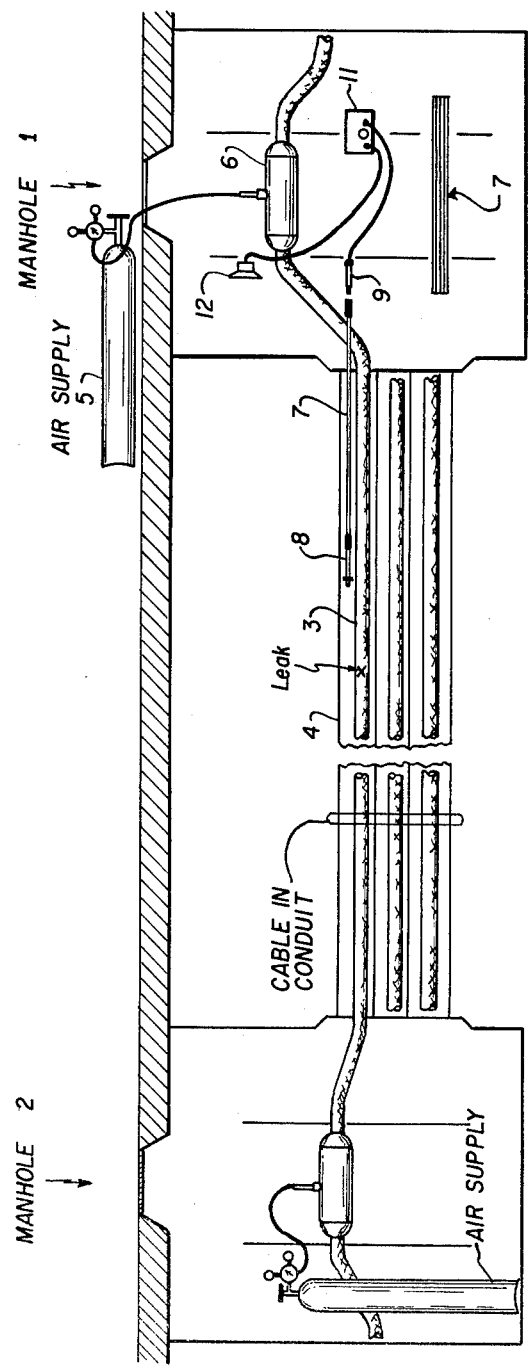
FIGURE 1 is a diagramamtic illustration of a series of conduits containing telephone cables running between two manholes, with air pressure applied to the cable under test and showing the end probe with its microphone assembly inserted into the conduit and connected by a connector rod to the handle assembly and from the handle by wires through an amplifier unit to a speaker in one of the manholes.
Figure 2:
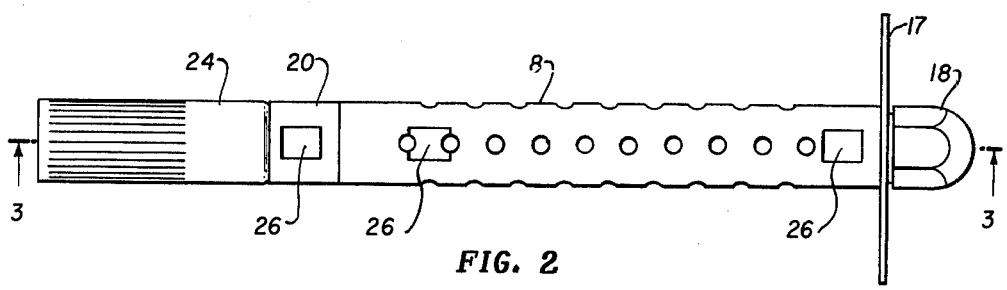
FIG. 2 is an outer view of the end probe containing the microphones.

Referring to the drawings:

FIG. 1 illustrates a cable such as 3 extending between a manhole 1 and manhole 2 in one of the channels of a conduit 4. We have shown a source of compressed air or nitrogen under pressure at 5, connected to the joint 6 of cable 3. We have illustrated at point X where a leak has occurred in the sheath of cable 3. The source 5 supplies nitrogen under about 10 pounds pressure to the cable under test and at such pressure will cause a hissing noise as it escapes through the leak at X. In this illustration the test for the location of the leak is being made from manhole 1 where a series of the connecting rods 7 have been stored and the end probe 8 containing a pair of microphones, as will be described, has been inserted into the upper channel of conduit 4 alongside of the cable containing leak X. The end probe is shown connected to a connecting rod 7 and to the handle 9 which is in turn connected by wires 10 to the amplifier unit 11 and thence to speaker 12. Additional rods 7 are connected to each other and to probe 8 until it is extended far enough into the channel to reach a point adjacent the leak X so that the hissing sound is picked up by the microphones in the probe and can be distinctly heard in the speaker 12.

Figure 3:
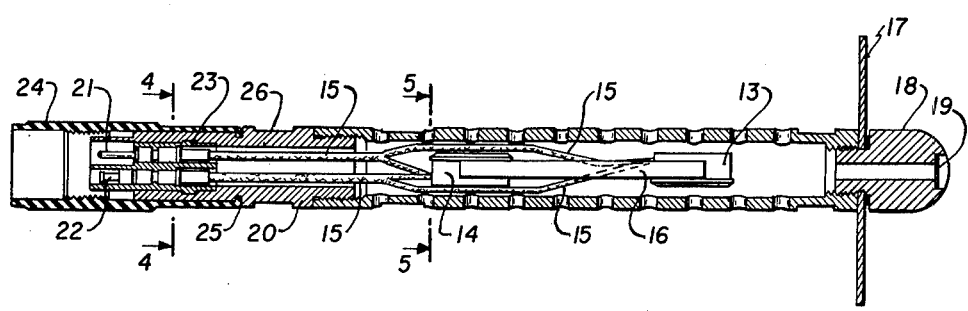
FIG. 3 is a sectional view taken lengthwise in the direction of the arrows along line 3—3 of FIG. 2.
Figure 4:
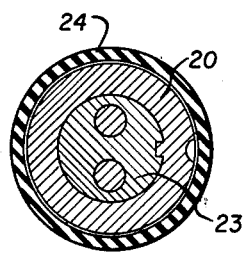
FIG. 4 is a sectional view taken along lines 4—4 of FIG. 3.
Figure 5:
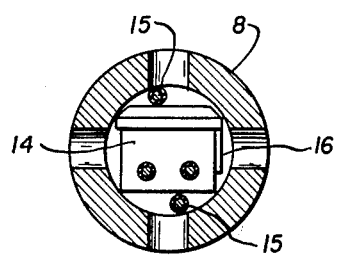
FIG. 5 is another sectional view taken along lines 5—5 of FIG. 3.
Figure 6:
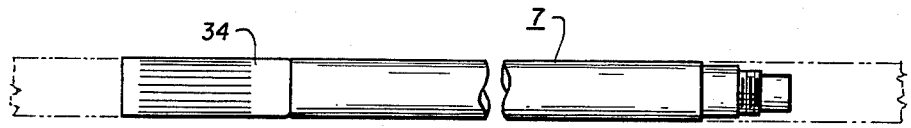
FIG. 6 is an outer view of one of the connecting rods.
Figure 7:
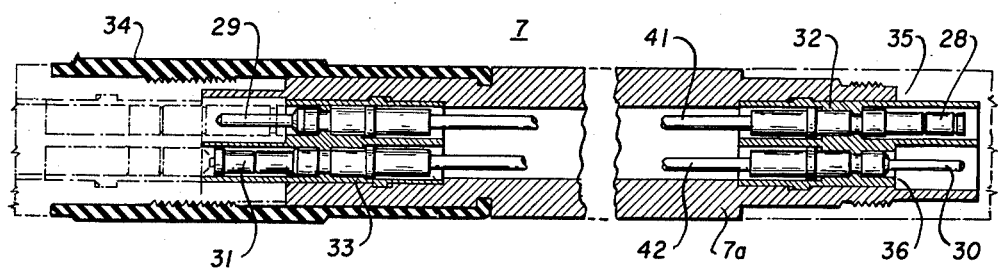
FIG. 7 is an enlarged sectional view taken along a longitudinal line through the center of FIG. 6.

Referring now to FIGS. 2–5. We have shown the detailed construction of probe 8 with its perforated shell in the center section containing microphones 13 and 14 connected in multiple by wires 15 as shown and held in position in the probe by a brass strip 16 cemented to the sides of the microphones. At the front end of the probe is secured a disc 17 of a plastic material such as Teflon held in position by the probe tip 18 threaded into threads on the inner part of the perforated center sleeve. A screen 19 is secured in the opening in the probe tip 18. After the microphone assembly has been inserted into the perforated shell with the wires connected thereto, a tube 20 is threaded into the inner threads in the left end of the shell and encloses the male terminal or jack 21 and the female jack terminal 22 connected to the ends of wires 15. The terminals 21 and 22 are held in place and insulated from tube 20 by a sleeve 23 of insulating material. A coupling nut 24 is rotatably secured to the tube 20 and rotates freely by means of the end thereof being turned into a groove 25 in tube 20. The coupling nut 24 has internal threads by means of which it may be secured to any of the connector rods such as shown in FIGS. 6 and 7. All of the metal parts of probe 8 are preferably constructed of anodized aluminum alloy and the perforated shell and tube 20 have flattened surfaces at 26 so that a wrench may be applied thereto for disassembling. FIGS. 4 and 5 show the location of the microphones and conductors in the probe.

Referring now to FIGS. 6 and 7. We have shown the detailed construction of one of the connecting rods 7. Each of the rods are in this example made to measure exactly 4 feet in length. When coupled together the distance to the leak, when located, may be readily computed by multiplying 4 feet by the number of rods used to extend the probe into the conduit. Each rod comprises the aluminum center section 7a formed at its right hand end to fit into the coupling nut 24 of the probe 8 or into the left hand end of another rod 7. A pair of wires 41 and 42 extends through the rod and connect the upper female terminal jack 28 at the right end with the male terminal jack 29 at the left end, and the right hand male jack terminal 30 with the female jack terminal 31 at the left end. The terminals 28 to 31 inclusive are formed of copper with gold flashing as are the terminals in probe 7. Insulating sleeves 32 and 33 separate the terminals from each other and from the aluminum sleeve 7a. Again a coupling nut 34 is rotatably mounted on the left end and has a knurled surface for ease in turning.

In dotted lines at the left end of the rod in FIG. 7, we have shown a second rod 7 inserted into coupling nut 34. This also illustrates how the handle 9 of FIG. 8 could also be secured to the left end of rod 7. It will be noted that FIGS. 7 and 8 have been shown slightly enlarged as compared to FIG. 3 although the probe, the rod 7 and handle 8 are all of the same thickness. It will also be noted that the upper right end of the aluminum center section has been cut away at 35 for a portion of its circumference and insulating member 32 has also been cut away at the lower side so that this end will line up properly with similar cut away portions of the left end of other rods 7 which are cut away in reverse order and with the left end of probe 8 as shown in FIG. 3 so that the jacks will be properly aligned and connections properly made when the elements are connected together.

Figure 8:
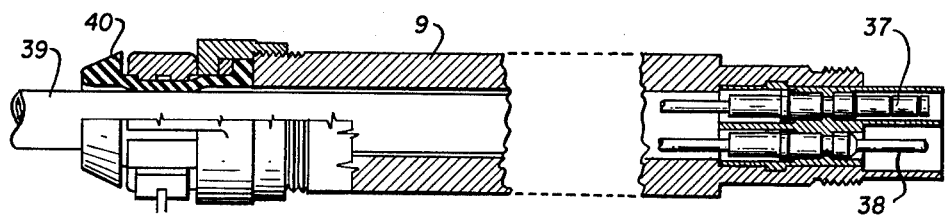
FIG. 8 is a sectional view of the handle section showing the wires connected to one end and the connecting terminals at the other end for connection with a rod as indicated in FIG. 7.

FIG. 8 is a partially sectional view of the handle part 9 of the probe assembly and its right hand coupling end is exactly the same as the right hand end of rods 7 with female jack 37 and male jack 38 formed to cooperate with the left ends of rods 7. At the left end of handle 9 the wires are formed into a cable 39 and a cap 40 forms the end of the handle.

The disc 17 at the front end of probe 8 keeps the probe centered in the conduit as it is forced along beside the cable and also keeps mud or dirt from entering the holes in the probe. As the probe is inserted into a conduit with one rod 7 and handle 9 attached thereto the connection is complete from the microphones 13 and 14 to the speaker 12. The operator will pause and listen at intervals for the hissing sound and if not heard will insert another rod 7 by removing the handle 9 and coupling in the extra rod. This process is repeated by adding additional rods and listening until the hissing sound increases to its maximum loudness and then decreases as the probe passes beyond the leak X. When this occurs the probe is withdrawn and the number of rods counted to determine the exact distance to the leak. The digging for repairing of the leak can thus be accurately determined at a certain distance from manhole 1. In practice a carrying case is used to enclose the audible speaker, the amplifier unit comprising for example three "Altec" line amplifiers, the connector rods 7 and the probe 8 and handle 9, with proper plugs and jacks to link the speaker and amplifier with the handle.

Having fully described the features and aspects of our invention, what we consider to be novel will be pointed out in the appended claim.

What we claim is:

An apparatus for locating a leak in a telephone cable laid in an underground conduit extending from one manhole to another, in which a pressure of air is maintained in the cable and therefore causes a hissing sound when air escapes from any leak in the cable, comprising a long slender probe containing a pair of microphones facing in opposite directions within the probe and having perforations around the circumference of the probe to carry sounds to both microphones, and having a circular disc of plastic material mounted near the front of the probe to maintain the probe centered in the conduit as the probe is advanced therein and preventing dirt from entering the perforations, a pair of terminals at the rear end of the probe connected to said microphones in parallel, a receiver located in one manhole and a handle containing a pair of wires connected to said receiver and to a pair of terminals in the handle, a series of connecting rods each having a pair of wires connected between terminals at each end of the rod, a plurality of said rods connectable together by means of said terminals to extend said probe into the conduit alongside a cable while maintaining the microphones connected to the receiver, until a hissing sound picked up by the microphones and reproduced in the receiver is at its loudest point, the number of rods connected between the probe and the handle indicating the distance from the manhole to the leak.

References Cited by the Examiner

UNITED STATES PATENTS

| | | | |
|---|---|---|---|
| 188,778 | 3/77 | Coil | 33—125 |
| 882,141 | 3/08 | Cope | 73—40.5 X |
| 2,229,211 | 1/41 | Korengold | 339—89 X |
| 2,396,935 | 3/46 | Walstrom. | |
| 2,606,224 | 8/52 | Modrey | 339—89 X |
| 2,884,624 | 4/59 | Dean et al. | 73—40.5 X |

ISAAC LISANN, *Primary Examiner.*

ROBERT L. EVANS, *Examiner.*